US012640961B1

(12) United States Patent
Hervey

(10) Patent No.: US 12,640,961 B1
(45) Date of Patent: May 26, 2026

(54) METHODS AND APPARATUS FOR FORWARDING PACKETS IN A MESH SWITCHING SYSTEM

(71) Applicant: Marvell Asia Pte Ltd, Singapore (SG)

(72) Inventor: George Hervey, South Pasadena, CA (US)

(73) Assignee: Marvell Asia Pte Ltd, Singapore (SG)

( * ) Notice: Subject to any disclaimer, the term of this patent is extended or adjusted under 35 U.S.C. 154(b) by 771 days.

(21) Appl. No.: 15/799,627

(22) Filed: Oct. 31, 2017

Related U.S. Application Data

(60) Provisional application No. 62/415,190, filed on Oct. 31, 2016.

(51) Int. Cl.
| | |
|---|---|
| *H04L 12/54* | (2022.01) |
| *H04L 12/46* | (2006.01) |
| *H04L 49/00* | (2022.01) |
| *H04L 49/25* | (2022.01) |

(52) U.S. Cl.
CPC .......... *H04L 12/56* (2013.01); *H04L 12/4637* (2013.01); *H04L 49/252* (2013.01); *H04L 49/3045* (2013.01)

(58) Field of Classification Search
None
See application file for complete search history.

(56) References Cited

U.S. PATENT DOCUMENTS

| | | | | | |
|---|---|---|---|---|---|
| 6,246,692 | B1 * | 6/2001 | Dai | .......................... | H04L 12/42 |
| | | | | | 370/438 |
| 7,382,787 | B1 * | 6/2008 | Barnes | ..................... | H04L 12/66 |
| | | | | | 370/473 |

| | | | | | |
|---|---|---|---|---|---|
| 7,525,904 | B1 * | 4/2009 | Li | ........................ | H04L 49/3072 |
| | | | | | 370/219 |
| 8,547,971 | B1 | 10/2013 | Mizrahi | | |
| 8,553,582 | B1 | 10/2013 | Mizrahi et al. | | |
| 8,625,594 | B2 | 1/2014 | Safrai et al. | | |
| 8,681,603 | B1 * | 3/2014 | Bishara | ................... | H04L 45/22 |
| | | | | | 370/216 |
| 8,804,733 | B1 | 8/2014 | Safrai et al. | | |
| 9,237,100 | B1 | 1/2016 | Mizrahi et al. | | |

(Continued)

OTHER PUBLICATIONS

U.S. Appl. No. 15/423,389, Kampeas et al., "Distributed Dynamic Load Balanacing in Network Systems," filed Feb. 2, 2017.

*Primary Examiner* — Chirag G Shah
*Assistant Examiner* — Suk Jin Kang

(57) ABSTRACT

A first switching device in a switching system that includes a plurality of switching devices arranged in a partial mesh receives a packet directed to a second switching device in the switching system. The first switching device accesses a forwarding table to select a link via which to transmit the packet. The link is selected from among i) at least one destination link coupled to the first switching device, the destination link configured to only carry traffic, egressing the first switching device, that terminates at a next switching device directly coupled to the first switching device, and ii) at least one source link coupled to the first switching device, the source link configured to only carry traffic, egressing the first switching device, that is sourced, in the switching system, by the first switching device. The first switching device transmits the packet, via the selected link, towards the second switching device.

19 Claims, 10 Drawing Sheets

(56) References Cited

U.S. PATENT DOCUMENTS

| | | | |
|---|---|---|---|
| 2003/0016624 A1* | 1/2003 | Bare | H04L 45/302 |
| | | | 370/252 |
| 2003/0147385 A1* | 8/2003 | Montalvo | H04L 47/125 |
| | | | 370/389 |
| 2004/0151121 A1* | 8/2004 | Natarajan | H04L 45/02 |
| | | | 370/252 |
| 2004/0156321 A1* | 8/2004 | Michael Walker | H04L 45/02 |
| | | | 370/254 |
| 2004/0190444 A1* | 9/2004 | Trudel | H04J 3/085 |
| | | | 370/224 |
| 2004/0218597 A1* | 11/2004 | Choi | H04L 45/742 |
| | | | 370/389 |
| 2005/0099948 A1* | 5/2005 | Wakumoto | H04L 43/50 |
| | | | 370/236 |
| 2005/0105560 A1* | 5/2005 | Mann | H04L 45/28 |
| | | | 370/503 |
| 2005/0259587 A1* | 11/2005 | Wakumoto | H04L 43/50 |
| | | | 370/248 |
| 2006/0176880 A1* | 8/2006 | Bare | H04L 45/00 |
| | | | 370/392 |
| 2006/0182082 A1* | 8/2006 | Wakumoto | H04L 45/28 |
| | | | 370/351 |
| 2007/0014234 A1* | 1/2007 | Santoso | H04L 43/0817 |
| | | | 370/216 |
| 2007/0070909 A1* | 3/2007 | Reeve | H04L 45/00 |
| | | | 370/238 |
| 2007/0147364 A1* | 6/2007 | Palacharla | H04L 45/00 |
| | | | 370/389 |
| 2007/0171917 A1* | 7/2007 | Dai | H04L 49/352 |
| | | | 370/395.53 |
| 2007/0177597 A1* | 8/2007 | Ju | H04L 41/0806 |
| | | | 370/392 |
| 2007/0248009 A1* | 10/2007 | Petersen | H04L 12/4633 |
| | | | 370/230 |
| 2008/0267180 A1* | 10/2008 | Jorgensen | H04L 49/201 |
| | | | 370/389 |
| 2009/0052321 A1* | 2/2009 | Kamath | H04L 45/00 |
| | | | 370/235 |
| 2010/0220595 A1* | 9/2010 | Petersen | H04L 12/4633 |
| | | | 370/235 |
| 2011/0032825 A1* | 2/2011 | Minkenberg | H04L 49/3009 |
| | | | 370/422 |
| 2012/0076014 A1* | 3/2012 | Bragg | H04L 45/18 |
| | | | 370/252 |
| 2012/0106560 A1* | 5/2012 | Gumaste | H04L 45/04 |
| | | | 370/401 |
| 2012/0314703 A1* | 12/2012 | Testa | H04L 12/42 |
| | | | 370/389 |
| 2013/0114619 A1* | 5/2013 | Wakumoto | H04L 12/4641 |
| | | | 370/406 |
| 2013/0336315 A1* | 12/2013 | Guichard | H04L 12/4645 |
| | | | 370/389 |
| 2014/0254377 A1* | 9/2014 | Wakumoto | H04L 45/245 |
| | | | 370/235 |
| 2015/0098318 A1* | 4/2015 | Gooch | H04L 12/185 |
| | | | 370/228 |
| 2015/0117223 A1* | 4/2015 | Lih | H04L 12/437 |
| | | | 370/238 |
| 2015/0117224 A1* | 4/2015 | Lih | G06F 15/17362 |
| | | | 370/238 |
| 2015/0281055 A1* | 10/2015 | Lin | H04L 45/563 |
| | | | 370/389 |
| 2016/0029384 A1* | 1/2016 | Sidhu | H04W 72/0453 |
| | | | 370/329 |
| 2016/0112350 A1* | 4/2016 | Morrison | H04L 49/557 |
| | | | 370/218 |
| 2017/0012827 A1* | 1/2017 | Ashwood-Smith | H04L 41/12 |
| 2017/0013658 A1* | 1/2017 | Ta | H04L 45/04 |
| 2017/0054591 A1* | 2/2017 | Hyoudou | H04L 45/583 |
| 2017/0279707 A1* | 9/2017 | Curtin | H04L 45/18 |
| 2018/0351787 A1* | 12/2018 | Boyapati | H04L 41/0672 |
| 2019/0037341 A1* | 1/2019 | Krzych | G01S 5/0252 |
| 2020/0036622 A1* | 1/2020 | Tamizkar | H04L 45/74 |

* cited by examiner

Forwarding Table 122d

| Target Device | Link |
|---|---|
| SD1 | B |
| SD2 | B |
| SD3 | A |
| SD4 | Self |

Forwarding Table 122c

| Target Device | Link |
|---|---|
| SD1 | A |
| SD2 | A |
| SD3 | Self |
| SD4 | B |

Forwarding Table 122b

| Target Device | Link |
|---|---|
| SD1 | A |
| SD2 | Self |
| SD3 | B |
| SD4 | B |

Forwarding Table 122a

| Target Device | Link |
|---|---|
| SD1 | Self |
| SD2 | B |
| SD3 | A |
| SD4 | A |

*FIG. 1B*

352a — Source Device: SD1

| Target Device | Path | |
|---|---|---|
| 1 | Self | |
| 2 | 1 -> 2 | |
| 3 | 1 -> 4 | 4 -> 3 |
| 4 | 1 -> 4 | |
| 5 | 1 -> 4 | 4 -> 5 |
| 6 | 1 -> 7 | 7 -> 6 |
| 7 | 1 -> 7 | |
| 8 | 1 -> 7 | 7 -> 8 |
| 9 | 1 -> 10 | 10 -> 9 |
| 10 | 1 -> 10 | |
| 11 | 1 -> 10 | 10 -> 11 |
| 12 | 1 -> 13 | 13 -> 12 |
| 13 | 1 -> 13 | |
| 14 | 1 -> 13 | 13 -> 12 |
| 15 | 1 -> 15 | |

352b — Source Device: SD2

| Target Device | Path | |
|---|---|---|
| 1 | 2 -> 1 | |
| 2 | Self | |
| 3 | 2 -> 3 | |
| 4 | 1 -> 5 | 5 -> 4 |
| 5 | 2 -> 5 | |
| 6 | 2 -> 5 | 5 -> 6 |
| 7 | 2 -> 8 | 8 -> 7 |
| 8 | 2 -> 8 | |
| 9 | 2 -> 8 | 8 -> 9 |
| 10 | 2 -> 11 | 11 -> 10 |
| 11 | 2 -> 11 | |
| 12 | 2 -> 11 | 11 -> 12 |
| 13 | 2 -> 14 | 14 -> 13 |
| 14 | 2 -> 14 | |
| 15 | 2 -> 14 | 1 -> 15 |

352c — Source Device: SD3

| Target Device | Path | |
|---|---|---|
| 1 | 3 -> 15 | 15 -> 1 |
| 2 | 3 -> 2 | |
| 3 | Self | |
| 4 | 3 -> 4 | |
| 5 | 3 -> 6 | 6 -> 5 |
| 6 | 3 -> 6 | |
| 7 | 3 -> 6 | 6 -> 7 |
| 8 | 3 -> 9 | 9 -> 8 |
| 9 | 3 -> 9 | |
| 10 | 3 -> 9 | 9 -> 10 |
| 11 | 3 -> 12 | 12 -> 11 |
| 12 | 3 -> 12 | |
| 13 | 3 -> 12 | 12 -> 13 |
| 14 | 3 -> 15 | 15 -> 14 |
| 15 | 3 -> 15 | |

352d — Source Device: SD4

| Target Device | Path | |
|---|---|---|
| 1 | 4 -> 1 | |
| 2 | 4 -> 1 | 1 -> 2 |
| 3 | 4 -> 3 | |
| 4 | Self | |
| 5 | 4 -> 5 | |
| 6 | 4 -> 7 | 7 -> 6 |
| 7 | 4 -> 7 | |
| 8 | 4 -> 7 | 7 -> 8 |
| 9 | 4 -> 10 | 10 -> 9 |
| 10 | 4 -> 10 | |
| 11 | 4 -> 10 | 10 -> 11 |
| 12 | 4 -> 13 | 13 -> 12 |
| 13 | 4 -> 13 | |
| 14 | 4 -> 13 | 13 -> 14 |
| 15 | 4 -> 1 | 1 -> 15 |

Source Device: SD5

| Target Device | Path | |
|---|---|---|
| 1 | 5 -> 2 | 2 -> 1 |
| 2 | 5 -> 2 | |
| 3 | 5 -> 2 | 2 -> 3 |
| 4 | 5 -> 4 | |
| 5 | Self | |
| 6 | 5 -> 6 | |
| 7 | 5 -> 8 | 8 -> 7 |
| 8 | 5 -> 8 | |
| 9 | 5 -> 8 | 8 -> 9 |
| 10 | 5 -> 11 | 11 -> 10 |
| 11 | 5 -> 11 | |
| 12 | 5 -> 11 | 11 -> 12 |
| 13 | 5 -> 14 | 14 -> 13 |
| 14 | 5 -> 14 | |
| 15 | 5 -> 14 | 14 -> 15 |

352f

Source Device: SD6

| Target Device | Path | |
|---|---|---|
| 1 | 6 -> 15 | 15 -> 1 |
| 2 | 6 -> 3 | 3 -> 2 |
| 3 | 6 -> 3 | |
| 4 | 6 -> 3 | 3 -> 4 |
| 5 | 6 -> 5 | |
| 6 | Self | |
| 7 | 6 -> 7 | |
| 8 | 6 -> 9 | 9 -> 8 |
| 9 | 6 -> 9 | |
| 10 | 6 -> 9 | 9 -> 10 |
| 11 | 6 -> 12 | 12 -> 11 |
| 12 | 6 -> 12 | |
| 13 | 6 -> 12 | 12 -> 14 |
| 14 | 6 -> 15 | 15 -> 14 |
| 15 | 6 -> 15 | |

352g

Source Device: SD7

| Target Device | Path | |
|---|---|---|
| 1 | 7 -> 1 | |
| 2 | 7 -> 1 | 1 -> 2 |
| 3 | 7 -> 4 | 4 -> 3 |
| 4 | 7 -> 4 | |
| 5 | 7 -> 4 | 4 -> 5 |
| 6 | 7 -> 6 | |
| 7 | Self | |
| 8 | 7 -> 8 | |
| 9 | 7 -> 10 | 10 -> 9 |
| 10 | 7 -> 10 | |
| 11 | 7 -> 10 | 10 -> 11 |
| 12 | 7 -> 13 | 13 -> 12 |
| 13 | 7 -> 13 | |
| 14 | 7 -> 13 | 13 -> 14 |
| 15 | 7 -> 1 | 1 -> 15 |

352h

Source Device: SD8

| Target Device | Path | |
|---|---|---|
| 1 | 8 -> 2 | 2 -> 1 |
| 2 | 8 -> 2 | |
| 3 | 8 -> 2 | 2 -> 3 |
| 4 | 8 -> 5 | 5 -> 4 |
| 5 | 8 -> 5 | |
| 6 | 8 -> 5 | 5 -> 6 |
| 7 | 8 -> 7 | |
| 8 | Self | |
| 9 | 8 -> 9 | |
| 10 | 8 -> 11 | 11 -> 10 |
| 11 | 8 -> 11 | |
| 12 | 8 -> 11 | 11 -> 12 |
| 13 | 8 -> 14 | 14 -> 13 |
| 14 | 8 -> 14 | |
| 15 | 8 -> 14 | 14 -> 15 |

*FIG. 3C*

Source Device: SD9 (352i)

| Target Device | Path | |
|---|---|---|
| 1 | 9 -> 15 | 15 -> 1 |
| 2 | 9 -> 3 | 3 -> 2 |
| 3 | 9 -> 3 | |
| 4 | 9 -> 3 | 3 -> 4 |
| 5 | 9 -> 6 | 6 -> 5 |
| 6 | 9 -> 6 | |
| 7 | 9 -> 6 | 6 -> 7 |
| 8 | 9 -> 8 | |
| 9 | Self | |
| 10 | 9 -> 10 | |
| 11 | 9 -> 12 | 12 -> 11 |
| 12 | 9 -> 12 | |
| 13 | 9 -> 12 | 12 -> 13 |
| 14 | 9 -> 15 | 15 -> 14 |
| 15 | 9 -> 15 | |

Source Device: SD10 (352j)

| Target Device | Path | |
|---|---|---|
| 1 | 10 -> 1 | |
| 2 | 10 -> 1 | 1 -> 2 |
| 3 | 10 -> 4 | 4 -> 3 |
| 4 | 10 -> 4 | |
| 5 | 10 -> 4 | 4 -> 5 |
| 6 | 10 -> 7 | 7 -> 6 |
| 7 | 10 -> 7 | |
| 8 | 10 -> 7 | 7 -> 8 |
| 9 | 10 -> 9 | |
| 10 | Self | |
| 11 | 10 -> 11 | |
| 12 | 10 -> 13 | 13 -> 12 |
| 13 | 10 -> 13 | |
| 14 | 10 -> 13 | 13 -> 14 |
| 15 | 10 -> 1 | 1 -> 15 |

Source Device: SD11 (352k)

| Target Device | Path | |
|---|---|---|
| 1 | 11 -> 2 | 2 -> 1 |
| 2 | 11 -> 2 | |
| 3 | 11 -> 2 | 2 -> 3 |
| 4 | 11 -> 5 | 5 -> 4 |
| 5 | 11 -> 5 | |
| 6 | 11 -> 5 | 5 -> 6 |
| 7 | 11 -> 8 | 7 -> 6 |
| 8 | 11 -> 8 | 8 -> 7 |
| 9 | 11 -> 8 | 8 -> 9 |
| 10 | 11 -> 10 | |
| 11 | Self | |
| 12 | 11 -> 12 | |
| 13 | 11 -> 14 | 14 -> 13 |
| 14 | 11 -> 14 | |
| 15 | 11 -> 14 | 14 -> 15 |

Source Device: SD12 (3521)

| Target Device | Path | |
|---|---|---|
| 1 | 12 -> 15 | 15 -> 1 |
| 2 | 12 -> 3 | 3 -> 2 |
| 3 | 12 -> 3 | |
| 4 | 12 -> 3 | 3 -> 4 |
| 5 | 12 -> 6 | 6 -> 5 |
| 6 | 12 -> 6 | |
| 7 | 12 -> 6 | 6 -> 7 |
| 8 | 12 -> 9 | 9 -> 8 |
| 9 | 12 -> 9 | |
| 10 | 12 -> 9 | 9 -> 10 |
| 11 | 12 -> 11 | |
| 12 | Self | |
| 13 | 12 -> 13 | |
| 14 | 12 -> 15 | 15 -> 14 |
| 15 | 12 -> 15 | |

*FIG. 3D*

Source Device: SD13 (352m)

| Target Device | Path | |
|---|---|---|
| 1 | 13 -> 1 | |
| 2 | 13 -> 1 | 1 -> 2 |
| 3 | 13 -> 4 | 4 -> 3 |
| 4 | 13 -> 4 | |
| 5 | 13 -> 4 | 4 -> 5 |
| 6 | 13 -> 7 | 7 -> 6 |
| 7 | 13 -> 7 | |
| 8 | 13 -> 7 | 7 -> 8 |
| 9 | 13 -> 10 | 10 -> 9 |
| 10 | 13 -> 10 | |
| 11 | 13 -> 10 | 10 -> 11 |
| 12 | 13 -> 12 | |
| 13 | Self | |
| 14 | 13 -> 14 | |
| 15 | 13 -> 1 | 1 -> 15 |

Source Device: SD14 (352n)

| Target Device | Path | |
|---|---|---|
| 1 | 14 -> 2 | 2 -> 1 |
| 2 | 14 -> 2 | |
| 3 | 14 -> 2 | 2 -> 3 |
| 4 | 14 -> 5 | 5 -> 4 |
| 5 | 14 -> 5 | |
| 6 | 14 -> 5 | 5 -> 6 |
| 7 | 14 -> 8 | 8 -> 7 |
| 8 | 14 -> 8 | |
| 9 | 14 -> 8 | 8 -> 9 |
| 10 | 14 -> 11 | 11 -> 10 |
| 11 | 14 -> 11 | |
| 12 | 14 -> 11 | 11 -> 12 |
| 13 | 14 -> 13 | |
| 14 | Self | |
| 15 | 14 -> 15 | |

Source Device: SD15 (3520)

| Target Device | Path | |
|---|---|---|
| 1 | 15 -> 1 | |
| 2 | 15 -> 3 | 3 -> 2 |
| 3 | 15 -> 3 | |
| 4 | 15 -> 3 | 3 -> 4 |
| 5 | 15 -> 6 | 6 -> 5 |
| 6 | 15 -> 6 | |
| 7 | 15 -> 6 | 6 -> 7 |
| 8 | 15 -> 9 | 9 -> 8 |
| 9 | 15 -> 9 | |
| 10 | 15 -> 9 | 9 -> 10 |
| 11 | 15 -> 12 | 12 -> 11 |
| 12 | 15 -> 12 | |
| 13 | 15 -> 12 | 12 -> 13 |
| 14 | 15 -> 14 | |
| 15 | Self | |

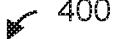
400

402

Receive, at a first switching device, a packet directed to a second
switching device of the plurality of switching devices

404

Select, based on accessing a forwarding table, a link via which to transmit
the packet towards the second switching device, the forwarding table
configured to select the link from among i) at least one destination link
coupled to the first switching device, the destination link configured to carry
only traffic, egressing the first switching device, that terminates at a next
switching device directly coupled, via the destination link, to the first
switching device and ii) at least one source link coupled to the first
switching device, the source link configured to carry only traffic, egressing
the first switching device, that is sourced, in the switching system, by the
first switching device

406

Transmit, from the first switching device via the selected link, the packet
towards the second switching device

METHODS AND APPARATUS FOR FORWARDING PACKETS IN A MESH SWITCHING SYSTEM

CROSS-REFERENCE TO RELATED APPLICATION

This application that claims the benefit of U.S. Provisional Patent Application No. 62/415,190, entitled "Method for Congestion Free Packet Forwarding in a Mesh Using VOQ and Source/Destination Based Routing," which was filed on Oct. 31, 2016, the disclosure of which is hereby incorporated by reference in its entirety.

FIELD OF THE DISCLOSURE

The present disclosure relates generally to communication networks and, more particularly, to forwarding packets in a switching system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to interconnect the servers and to communicatively couple the servers to outside network connections, such as backbone network links. In such applications, switching systems capable of switching between a high number of ports are utilized so that traffic can be forwarded between a backbone network line and a large number of servers and/or between each server and a large number of other servers. Such switching systems can include a large number of switches, and each switch typically is capable of switching between several ports.

The switches in a switching system are typically arranged in a topology that allows any switch in the system to forward packets to any other switch in the switching system so that packets can be readily forwarded to any destination connected to the switching system. For example, in some typical switching systems, the switches are arranged in a full mesh topology in which every switch in the system is connected via a respective direct link to any other switch in the system. Full mesh topology allows non-blocking forwarding of packets at the expense of a large number of physical connections needed to directly connect each switch to each other switch in the system. Alternatively, in other typical switching systems, the switches are interconnected in topologies that forward packets to their destinations via one or more intermediate devices. Such typical systems require fewer physical connections as compared to systems that employ full mesh topologies. However, in such typical system, non-blocking forwarding of packets typically cannot be guaranteed.

SUMMARY

In an embodiment, a first switching device configured to operate in a switching system that includes a plurality of switching devices arranged in a partial mesh topology. The first switching device comprises an ingress interface device configured to receive a packet directed to a second switching device among the plurality of switching devices. The first switching device also comprises a packet processor configured to access a forwarding table to select a link via which to transmit the packet towards the second switching device, the forwarding table configured to select the link from among i) at least one destination link coupled to the first switching device, the destination link configured to only carry traffic, egressing the first switching device, that terminates at a next switching device directly coupled, via the destination link, to the first switching device and ii) at least one source link coupled to the first switching device, the source link configured to only carry traffic, egressing the first switching device, that is sourced, in the switching system, by the first switching device. The first switching device additionally comprises an egress interface device configured to transmit the packet, via the selected link, towards the second switching device.

In another embodiment, a method for forwarding packets in a switching system having a plurality of switching devices arranged in a partial mesh topology. The method includes receiving, at a first switching device of the plurality of switching devices, a packet directed to a second switching device of the plurality of switching devices. The method also includes selecting, based on accessing a forwarding table, a link via which to transmit the packet towards the second switching device, the forwarding table configured to select the link from among i) at least one destination link coupled to the first switching device, the destination link configured to only carry traffic, egressing the first switching device, that terminates at a next switching device directly coupled, via the destination link, to the first switching device and ii) at least one source link coupled to the first switching device, the source link configured to only carry traffic, egressing the first switching device, that is sourced, in the switching system, by the first switching device. The method additionally includes transmitting, from the first switching device via the selected link, the packet towards the second switching device.

In still another embodiment, a switching system comprises a plurality of switching devices and an interconnect network configured to interconnect any switching device among the plurality of switching devices to any other switching device among the plurality of switching devices via ones of i) destination links configured to only carry traffic, egressing any particular switching device, that terminates at a next switching device directly coupled to the particular switching device, and ii) source links configured to only carry traffic, egressing any particular switching device, the traffic being sourced, in the switching system, by the particular switching device. A first switching device among the plurality of switching devices includes a forwarding table configured to select a link for transmitting a packet towards a second switching device among the plurality of switching devices, the link selected from among i) at least one source link coupled to the first switching device and ii) at least one destination link coupled to the first switching device.

BRIEF DESCRIPTION OF THE DRAWINGS

FIG. 1B is a diagram illustrating forwarding tables of the switching devices in the switching system of FIG. 1A, according to an embodiment.

FIGS. 3B-3E are diagrams illustrating tables that indicate paths via which packets travel from source switching devices to target switching devices in the switching system of FIG. 3A, according to an embodiment.

FIG. 4 is a flow diagram of an example method for forwarding packets in a switching system that includes a plurality of switching devices arranged in a partial mesh topology, according to an embodiment.

DETAILED DESCRIPTION

Embodiments are described herein in the context of forwarding traffic in a partial mesh topology of switching or routing devices in a network. It is noted however, in light of the disclosure and teachings herein, that similar methods and apparatus for forwarding traffic can be employed in other suitable systems in which multiple links or paths are available for forwarding data between multiple devices. The described forwarding methodologies are not limited to use in network device topologies, but rather may be utilized in other suitable contexts as well, such as any systems that require forwarding of data between a large number of devices or ports.

Figure 1A:
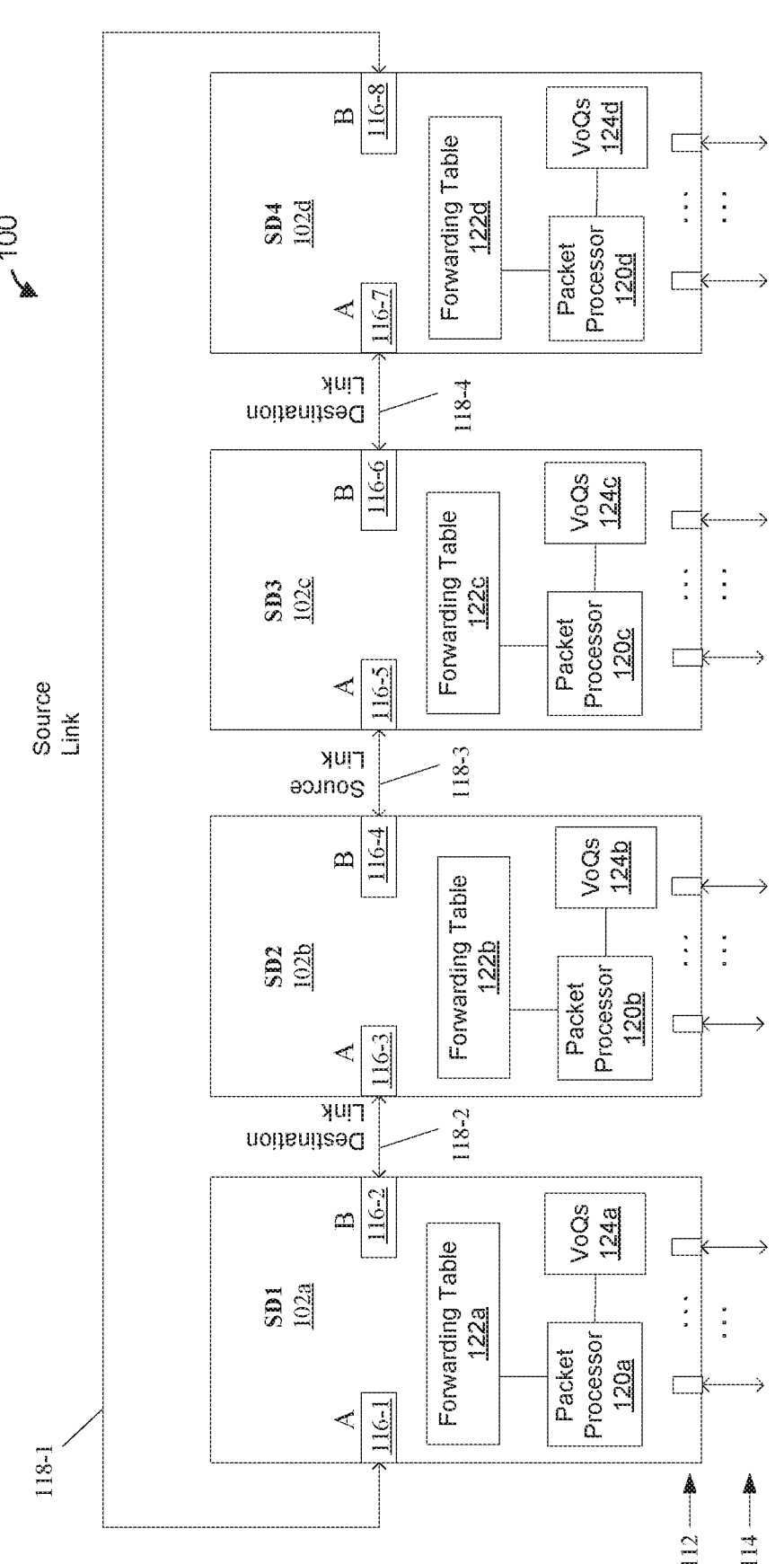
FIG. 1A is a block diagram of an example of a simplified switching system that includes a plurality of switching devices arranged in a ring topology, according to an embodiment.

FIG. 1A is a block diagram of an example switching system 100 that includes a plurality of switching devices 102 arranged in a ring topology, according to an embodiment. Each switching device 102 includes a plurality of downlink ports 112 for coupling the switching device 102 via communication links 114 (sometimes referred to herein as downlinks) to networks, devices in the networks, servers, storage device, or other host systems or devices between which network packets are forwarded in the switching system 100. Each switching device 102 also includes a plurality of uplink ports 116 for coupling the switching device 102 to other switching devices 102 in the switching system 100 via communication links 118 (sometimes referred to herein as uplinks). Although the switching devices 102 in FIG. 1 are illustrated as including downlink ports 112 and uplink ports 116, at least some of the ports 112, 116 are configured to support both uplink and downlink communications, in some embodiments. Although in the embodiment of FIG. 1, merely for explanatory purposes, the switching system 100 is illustrated as including four switching devices 102, the network system 100 includes other suitable numbers of switching devices 102, in other embodiments.

In the ring topology illustrated in FIG. 1, each switching device 102 is directly coupled via respective ports 116 and corresponding links 118 to two other switching devices 102 in the switching system 100, in an embodiment. For example, the switching device SD1 102a is directly coupled to the switching device SD4 102d via the port A 116-1 and the link 118-1 and is directly coupled to the switching device SD2 102b via the port B 116-2 and the link 118-2; the switching device SD2 102b is directly coupled to the switching device SD1 102a via the port A 116-3 and the link 118-2 and is directly coupled to the switching device SD3 102c via the port B 116-4 and the link 118-3; the switching device SD3 102c is directly coupled to the switching device SD2 102b via the port A 116-5 and the link 118-3 and is directly coupled to the switching device SD4 102d via the port B 116-6 and the link 118-4; and the switching device SD4 102d is directly coupled to the switching device SD3 102c via the port A 116-7 and the link 118-4 and is directly coupled to the switching device SD1 102a via the port B 116-8 and the link 118-1.

In an embodiment, when a first switching device 102 (sometimes referred to herein as "source switching device") in the switching system 100 receives a packet, the first switching device 102 determines a second switching device 102 (sometimes referred to herein as "target switching device") towards which the packet is to be forwarded through the switching system 100. The source switching device 102 then selects a particular port 116, or equivalently, a particular link 118 coupled to a particular port 116, via which to forward the packet towards the target switching device 102. In prior ring topology architectures, a link selected for forwarding a packet from a particular switching device in a ring topology could carry both i) traffic, egressing the particular switching device, that passes through a next switching device coupled, via the link, to the particular switching device and ii) traffic that is not sourced by the particular switching device (i.e., traffic for which the particular switching device is an intermediate switching device). In such prior configurations traffic on a path between a pair of switching devices in the ring topology could be blocked due to congestion on a path between another pair of switching devices, in some situations. For example, referring to FIG. 1, traffic from the switching device SD1 to the switching device SD3 in prior systems could be blocked due to congestion caused by traffic from the switching device SD2 to the switching device SD4. In various embodiments described below, however, techniques for forwarding traffic in the switching system 100 result in a non-blocking architecture that removes dependency of any one path defined in the switching system 100 on congestion in any other path defined in the switching system 100, and ensures that any two paths defined in the switching system 100 can be used simultaneously, in at least some embodiments.

In an embodiment, the switching system 100 creates the non-blocking architecture by designating or configuring respective uplinks 118 of the switching system 100 as ones of i) destination links 118 or ii) source links 118. A destination link 118 coupled to a particular switching device 102 is a link that is configured to only carry traffic, egressing the particular switching devices, that terminates at a next switching device 102 that is directly coupled, via the destination link 118, to the particular switching device 102, in an embodiment. In other words, a destination link 118 coupled to a particular switching device 102 does not carry traffic for which the next switching device that is directly coupled, via the destination link 118, to the particular switching device 102 is not the target switching device, or, equivalently, traffic for which the next switching device 102 would be an intermediate switching device through which the traffic would pass on the way to its target switching device. A source link 118 coupled to a particular switching device 102, on the other hand, is a link that is configured to only carry traffic, egressing the particular switching device, that is sourced, in the switching system 100, by the particular switching device 102, in an embodiment. In other words, a source link 118 coupled to a particular switching device 102 does not carry traffic, egressing the particular switching device 102, for which the particular switching device 102 is an intermediate switching device, in an embodiment. Depending on a particular target device of particular traffic sourced by the particular source switching device, the traffic carried by a source link 118 coupled to the particular source switching device 102 terminates at a next switching device 102 directly coupled, via the source link 118, to the particular switching device 102, or passes through the next switching device 102 on its way to its target switching device 102, in an embodiment. In an embodiment, a source link 118 coupled to a particular switching device 102 can carry traffic that terminates at a next switching device 102 directly coupled, via the source link 118, to the particular switching device 102 as long as this traffic is sourced, in the switching system 100, by the particular switching device 102 (i.e., the traffic is not sourced, in the switching system 100, by another one of the switching devices 102).

In an embodiment, each switching device 102 includes a respective packet processor 120, a respective forwarding table 122 and a respective set of virtual output queues (VoQ) 124. In an embodiment, a packet processor 120 of a switching device 102 is configured to process packets received by the switching device 102 via ports 112, 116, to determine other ports 112, 116 via which the packets are to be transmitted, and to transmit the packet via the determined port 112, 116. In an embodiment, if the switching device 102 receives a packet via a downlink port 112, then the switching device 102 is referred to as the source switching device of the packet. Similarly, if a switching device 102 contains a downlink port 112 via which a packet is to be transmitted, then the switching device 102 is referred to as the target switching device of the packet, in an embodiment. In an embodiment, a source switching device 102 that receives a packet determines a port 112 via which the packet is to be transmitted based on an address (e.g., an Ethernet address, a medium access layer (MAC) address, etc.) included in a header of the packet. In an embodiment, if the port 112 is a port of a switching device 102 other than the source switching device of the packet, the source switching device 102 generates a forwarding tag, such as a distributed switching architecture (DSA) tag, that indicates the target switching device 102 of the packet, and includes the forwarding tag in the header of the packet prior to forwarding the packet towards the target switching device 102.

In an embodiment, when a source switching device 102 receives a packet and determines the packet is to be transmitted via another port 102 of the source switching device 102, the source switching device 102 transmits the packet via the determined port 112 without forwarding the packet towards another target switching the packet towards another switching device 102 in the switching system 100. On the other hand, when a source switching device 102 receives a packet and determines than the packet is to be transmitted via a port 112 of another switching device 102 in the switching system 100, then the source switching devices determines an uplink port 116 (or, equivalently, a link 118) via which to forward the packet towards the other target switching device 102, in an embodiment. The source switching device 102 then forwards the packet via the selected uplink port 116 and corresponding link 118 towards the target switching device, in an embodiment.

In an embodiment, upon determining a target switching device 102 towards which a packet is to be forwarded, a packet processor 120 of a switching device 102 accesses a corresponding forwarding table 122 to determine a port 116 (or, equivalently, a link 118) via which the packet is to be forwarded towards the target switching device 102. The forwarding tables 122 are configured to provide selections of links, for forwarding packets from the switching devices 102 towards target switching devices 102, from among i) source links configured to only carry packets sourced by a single switching device 102 in the switching system 100 and ii) destination links configured to only carry packets that terminate at a next switching device to which the destination link is directly coupled, in an embodiment.

FIG. 1B is a diagram illustrating the forwarding tables 122a-122d of the switching devices 102a-102d, respectively, according to an embodiment. Each forwarding table 122a-122d stores associations between target devices and ports via which packets being processed by a corresponding switching device 102a-102d are to egress the switching device 102a-102d and/or links 118 via which the packets are to be forwarded from the switching device 102a-102d towards respective target switching devices, in an embodiment.

For example, with reference to FIGS. 1A and 1B, the forwarding table 122a of the switching device SD1 102a indicates that packets being processed by the switching device SD1 102a that are directed to the switching device SD2 102b are to egress the switching device SD1 102a via the port B 116-2 and, accordingly, are to be forwarded towards the switching device SD2 102b via the link 118-2 coupled to the port B 116-2, in the illustrated embodiment. Similarly, the forwarding table 122a of the switching device SD1 102a indicates that packets being processed by the switching device SD1 102a that are directed to the switching device SD3 102c or the switching device SD4 122d are to egress the switching device SD1 102a via the port A 116-1 and, accordingly, are to are forwarded towards the switching device SD3 102c or the switching device SD4 122d via the link 118-1 coupled to the port A 116-1, in the illustrated embodiment.

With continued reference to FIGS. 1A-1B, the forwarding table 122b of the switching device 102b indicates that packets being processed by the switching device SD2 102b that are directed to the switching device SD1 102a are to egress the switching device SD2 102b via the port A 116-3 and, accordingly, are to be forwarded towards the switching device SD1 102a via the link 118-2 coupled to the port A 116-3, in the illustrated embodiment. Further, the forwarding table 122b of the switching device 102b indicates that packets being processed by the switching device SD2 102b that are directed to the switching device SD3 102c or the switching device SD4 102d are to egress the switching device SD2 102b via the port B 116-4 and, accordingly, are to be forwarded towards the switching device SD3 102c or the switching device SD4 102d via the link 118-3 coupled to the port B 116-4, in the illustrated embodiment.

Referring still to FIGS. 1A-1B, the forwarding table 122c of the switching device SD3 102c indicates that packets being processed by the switching device SD3 102c that are directed to the switching device SD1 102a or the switching device SD2 102b are to egress the switching device SD3 102c via the port A 116-5 and, accordingly, are to be forwarded towards the switching device SD1 102a or the switching device SD2 102b via the link 118-3 coupled to the port A 116-5, in the illustrated embodiment. Further, the forwarding table 122c of the switching device SD3 102c indicates that packets being processed by the switching device SD3 102c that are directed to the switching device SD4 102*d* are to egress the switching device SD3 102*c* via the port B 116-6 and, accordingly, are to be forwarded towards the switching device SD4 102*d* via the link 118-4 coupled to the port B 116-6, in the illustrated embodiment.

With continued reference to FIGS. 1A-1B, the forwarding table 122*d* of the switching device SD4 102*d* indicates that packets being processed by the switching device SD4 102*d* that are directed to the switching device SD1 102*a* or the switching device SD2 102*b* are to egress the switching device SD4 102*d* via the port B 116-8 and, accordingly, are to be forwarded towards the switching device SD1 102*a* or the switching device SD2 102*b* via the link 118-1 coupled to the port B 116-8, in the illustrated embodiment. Further, the forwarding table 122*d* of the switching device SD4 102*d* indicates that packets being processed by the switching device SD4 102*d* that are directed to the switching device SD3 102*c* are to egress the switching device SD4 102*d* via the port A 116-7 and, accordingly, are to be forwarded towards the switching device SD3 102*c* via the link 118-4 coupled to the port B 116-7, in the illustrated embodiment.

Forwarding packets in the switching system 100 in accordance with the forwarding tables 122*a*-122*d* ensures that any given link 118 in the switching system 100 is either a source link configured to only carry packets sourced by a single switching device 102 in the switching system 100 or a destination link configured to only carry packets that terminate at a next switching device to which the destination link is directly coupled, in an embodiment. For example, the link 118-1 is a source link configured to only carry packets, egressing the switching device SD1 102*a*, that are sourced by the switching device SD1 102*a*, or, equivalently, to only carry packets egressing the switching device SD4 102*d* that are sourced by the switching device SD4 102*d*. Similarly, the link 118-3 is a source link configured to only carry packets, egressing the switching device SD2 102*b*, that are sourced by the switching device SD2 102*b*, or, equivalently, to only carry packets egressing the switching device SD3 102*c* that are sourced by the switching device SD3 102*c*. As discussed above, a source link 118 coupled to a particular switching device 102 can carry traffic that terminates at a next switching device 102 directly coupled, via the source link 118, to the particular switching device 102 as long as this traffic is sourced, in the switching system 100, by the particular switching device 102 (i.e., the traffic is not sourced, in the switching system 100, by another one of the switching devices 102), in an embodiment. As an example, the source link 118-1 can carry traffic that either terminates at the switching device SD4 102*d* or that passes through the switching device SD4 102*d* on its way to the switching device SD3 102, as long as the traffic is sourced, in the switching system 100, by the switching device SD1 102*a*, in an embodiment.

On the other hand, the link 118-2 is a destination link configured to only carry packets, egressing the switching device SD1 102*a*, that terminate at the switching device SD2 102*b* directly coupled via the link 118-2 to the switching device SD1 102*a*, or, equivalently, to only carry packets egressing the switching device SD2 102*b* that terminate at the switching device SD1 102*a* directly coupled via the link 118-2 to the switching device SD2 102*b*. Similarly, the link 118-4 is a destination link configured to only carry packets, egressing the switching device SD3 102*c*, that terminate at the switching device SD4 102*d* directly coupled via the link 118-4 to the switching device SD3 102*c*, or, equivalently, to only carry packets, egressing the switching device SD4 102*d*, that terminate at the switching device SD3 102*c* directly coupled via the link 118-4 to the switching device SD3 102*c*. In at least some embodiments, configuring the links 118 to be either source links or destination links as described above ensures that any traffic that passes through any given switching device 102 in the switching system 100 on its way to another switching device 102 in the switching system 100 is sourced, in the switching system 100, by only a single switching device 102 results in a non-blocking architecture that removes dependency of any one path defined in the switching system 100 on congestion in any other path defined in the switching system 100, and ensures that any two paths defined in the switching system 100 can be used simultaneously, in at least some embodiments.

Referring again to FIG. 1A, in some embodiments, the packet processors 120 of the switching devices 102 are configured to, upon determining ports 116 via which packets are to be egressed from the switching devices 102, place the packets in corresponding VoQs 124 that are specific to the determined egress ports 116, and to schedule the packets to be forwarded to the determined egress ports only when the egress ports are available (e.g., have sufficient bandwidth) to transmit the packets. Storing packets in VoQs 124 corresponding to ports via which the packets are to be transmitted and forwarding the packets from the VoQs 124 to the ports 116 via which the packets are to be transmitted only when the ports 116 are available to transmit the packets eliminates head of line (HoL) blocking scenarios in which congestion on one egress port 116 of the switching device 102 blocks packets directed to another port 116 of the switching device 102, for example, in an embodiment. As a more specific example, because the packet processor 120*a* of the switching device 102*a* is configured to place packets that are to be egressed via the port A 116-1 and packets that are to be egressed via the port B 116-2 in respective different VoQs 124, congestion on the link 118-1 coupled to the port A 116-1 will not affect transmission of packet the port 116-2 coupled to the link 118-2, and vice-versa, in an embodiment.

Referring still to FIG. 1A, the switching system 100 is suitable for use in edge networks, data centers, server farms, or any systems that require switching between a large number of ports, in an embodiment. In various embodiments, the ring topology of the switching system 100 serves as a scalable building block that facilitates creation of partial mesh topologies with larger number of switching devices. Scaled switching systems that include larger numbers of switching devices allow switching between larger numbers of ports (e.g., larger numbers of downlink ports 112 in FIG. 1), in various embodiments. In an embodiment, the number of switching devices 102 in the switching system 100 is generally determined by a number of networks, devices in the networks, servers, storage devices, etc. that the switching system 100 is required to interconnect. Generally speaking, in an embodiment, the ring topology configured to operate as described with respect to FIGS. 1A-1B is easily scalable to include a number of switching devices that is a multiple of three. Thus, for example, a switching system configured to operate as described with respect to FIGS. 1A-1B includes 6, 9, 12, 15, 18, etc. switching devices, in various embodiments. Generally, a switching system configured to operate as described above with respect to FIGS. 1A-1B is readily scaled up by addition of a block of two consecutive switching devices, in an embodiment. Similarly, a switching system configured to operate as described above with respect to FIGS. 1A-1B is readily scaled down by removing a block of two consecutive switching devices, in an embodiment. Several example switching systems configured to operate as described above with respect to FIGS. 1A-1B, according to some embodiments, are described in more detail below in connection with FIGS. 2A-2B and 3A-3E.

Figure 2A:
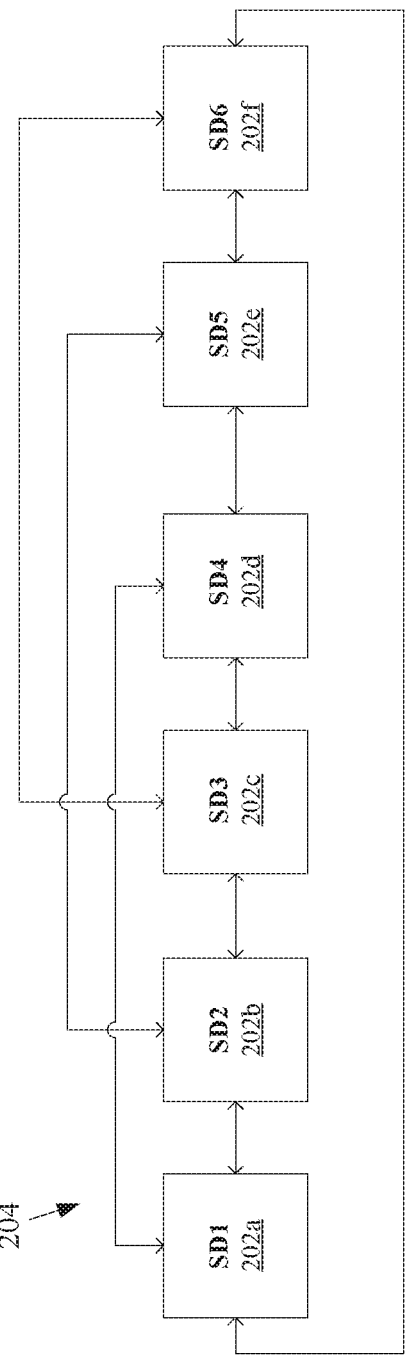
FIG. 2A is a block diagram of an example of a simplified switching system that includes a plurality of switching devices arranged in a partial mesh topology, according to another embodiment.

FIG. 2A is a block diagram of an example simplified switching system 200 that includes a plurality of switching devices 202 arranged in a partial mesh topology, according to an embodiment. The example switching system 200 is generally similar to the switching system 100 of FIG. 1. The switching system 200 includes six switching devices 202a-202f, interconnected by an interconnect network having a plurality of uplinks 204, in the illustrated embodiment. Each switching device 202 corresponds to a switching device 102 and forwards packets in the manner described above with respect to FIG. 1, in an embodiment. Each switching device 202 is part of a ring topology than includes four switching devices arranged as the switching system 100 of FIG. 1, in an embodiment. For example, the switching device SD1 202a is part of a ring topology that includes the switching devices SD1 202a, SD2 202b, SD3 202c and SD4 202d; the switching device SD2 202b is part of a ring topology that includes switching devices SD2 202b, SD3 202c, SD4 202d and SD5 202e; the switching device SD3 202c is part of a ring topology that includes the switching devices SD3 202c, SD4 202d, SD5 202e and SD6 202f; and so on, in an embodiment. Additionally, the switching device SD1 202a is connected directly to the switching device SD6 202f to complete the ring topology that includes all switching devices 202 in the switching system 200, in an embodiment. Accordingly, each switching device 202 is directly connected to each of two neighboring devices 202 and is also directly connected to third switching devices 202 that complete the ring of which the switching device 202 is a part, in an embodiment.

Figure 2B:
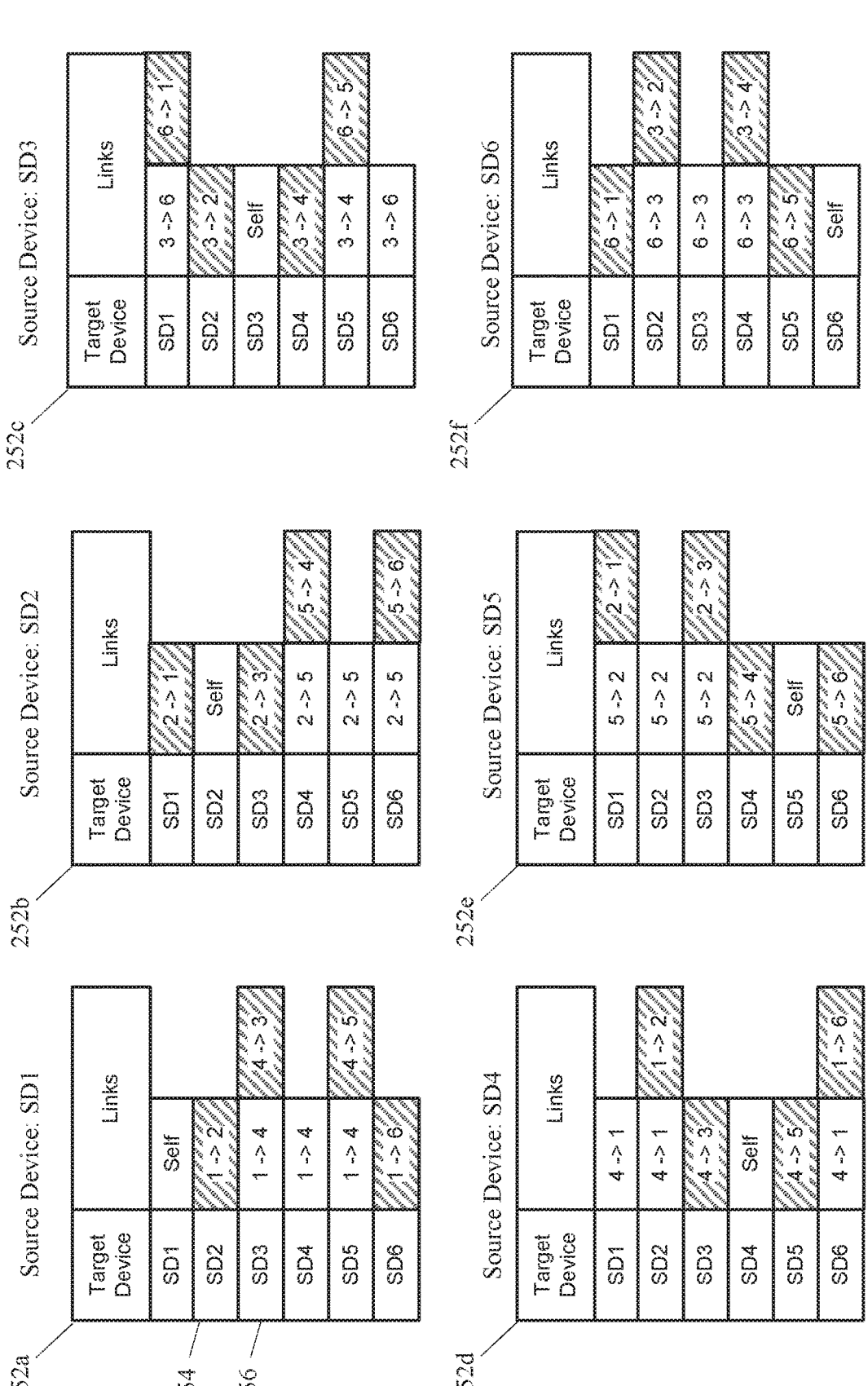
FIG. 2B is a diagram illustrates tables that indicate paths via which packets travel from source switching devices to target switching devices in the switching system of FIG. 2A, according to an embodiment.

In an embodiment, each link 204 is configured to be either a source link 204 or a destination link 204 in the manner described above with respect to FIGS. 1A-1B. FIG. 2B illustrates tables 252a-252f that indicate paths via which packets travel from source switching devices 202 to target switching devices 202 in the switching system 200 of FIG. 2A, according to an embodiment. In particular, each table 252a-252f of FIG. 2B corresponds to a particular source switching device 202a-202d in FIG. 2A and indicates links via which packets travel from the particular source switching device 202a-202d to each target switching device 202a-202d in the switching system 200 of FIG. 2A, in an embodiment.

A link from a switching device 202 x to a switching device 202 y in FIG. 2B is indicated by the notation x→y. As seen in FIG. 2B, each path from a source switching device 202 z to a target switching device 202 v consists either of i) one link from the source switching device 202 z to the target switching device 202 v or ii) two links including a first link from the source switching device 202 z to an intermediate switching device 202 w and a second link from the intermediate switching device 202 w to the target switching device 202 v. As an illustrative example, an entry 254 of the table 252a corresponding to the source switching device SD1 202a indicates that a packet travels from the source switching device SD1 202a to the target switching device SD2 202b via a direct link 1→2 from the switching device SD1 202a to the switching device SD2 202b. On the other hand, an entry 256 of the table 252a indicates that a packet travels from the source switching device SD1 202a to the target switching device SD3 202c via a path that includes a first link 1→4 from the switching device SD1 202a to an intermediate switching device SD4 202d and a second link 4→3 from the intermediate switching device SD4 202d to the target switching device SD3 202c, in the illustrated embodiment.

In an embodiment, configuring the switching devices 202 of FIG. 2A to forward packets from source switching device 202 to target switching devices 202 through the switching system 200 via the links indicated in the corresponding tables 252 of FIG. 2B ensures that each link 204 in the switching system 200 is either a source link configured to only carry packets sourced by a single switching device 202 or a destination link configured to only carry packets that terminate at a next switching device to which the destination link is directly coupled, in an embodiment. A source link coupled to a particular switching device 202 can carry traffic that terminates at a next switching device 202 directly coupled, via the source link, to the particular switching device 202 as long as this traffic is sourced, in the switching system 200, by the particular switching device 202 (i.e., the traffic is not sourced, in the switching system 200, by another one of the switching devices 202), in an embodiment.

Referring still to FIG. 2B, the non-patterned blocks in the tables 252 indicate source links and the patterned blocks in the tables 252 indicate destination links. As an example, referring to the entry 254 of the table 252a, the link 1→2 from the switching device SD1 202a to the switching device SD2 202b is illustrated by a patterned block to indicate that the link 1→2 is a destination link. As another example, referring to the entry 256 of the table 252a, the first link 1→4 from the switching device SD1 202a to the switching device SD4 202d is illustrated by a non-patterned block to indicate that the link 1→4 is a source link, and the second link 4→3 from the switching device SD4 202d to the switching device SD3 202c is illustrated by a patterned block to indicate that the link 4→3 is a destination link, in the illustrated embodiment.

Figure 3A:
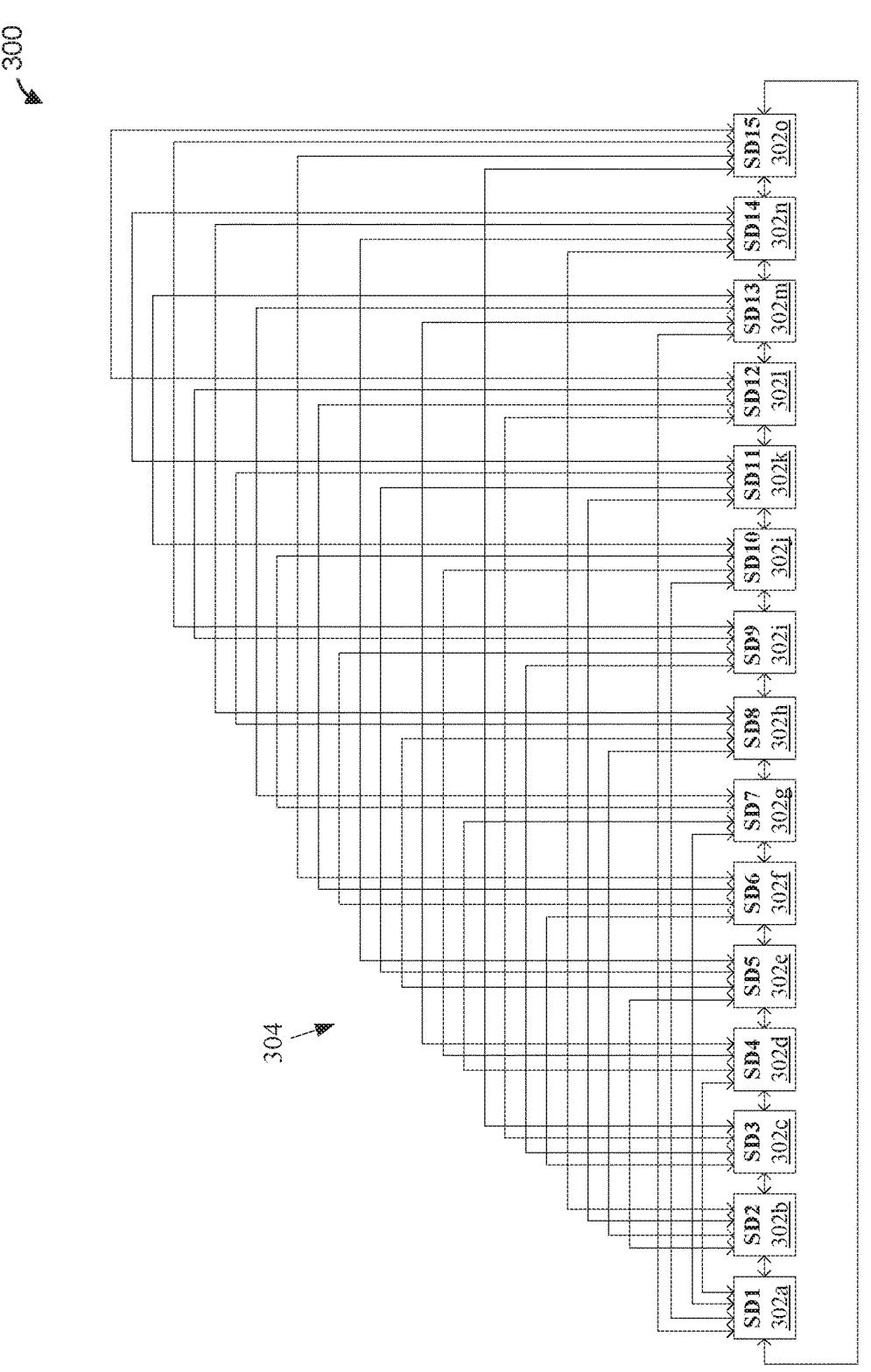
FIG. 3A is a block diagram of an example switching system that includes a plurality of switching devices arranged in a partial mesh topology, according to another embodiment.

FIG. 3A is a block diagram of another example simplified switching system 300 that includes a plurality of switching devices 302 arranged in a partial mesh topology, according to another embodiment. The example switching system 300 is generally similar to the switching system 200 of FIG. 2A, except that the switching system 300 includes 15 switching devices 302a-302o interconnected by links 304. Similar to the switching devices 202 of the switching system 200, each switching device 302 of the switching system 300 corresponds to a switching device 102 and forwards packets in the manner described above with respect to FIG. 1, in an embodiment. Also similar to the switching devices 202 of the switching system 200, each switching device 302 of the switching system 300 is part of a ring arranged as the ring topology of the switching system 100 of FIG. 1, in an embodiment. For example, the switching device SD1 202a is part of a ring topology that includes the switching devices SD1 202a, SD2 202b, SD3 202c and SD4 202d; the switching device SD2 202b is part of a ring topology that includes switching devices SD2 202b, SD3 202c, SD4 202d and SD5 202e; the switching device SD3 202c is part of a ring topology that includes the switching devices SD3 202c, SD4 202d, SD5 202e and SD6 202f; and so on, in an embodiment. Additionally, the switching device SD1 202a is connected directly to the switching device SD6 202f to complete a ring topology that includes all switching devices 202 in the switching system 200, in an embodiment. More generally, in an embodiment, the plurality of switching devices 320 comprises an ordered set of switching devices 302 arranged in a ring topology, and wherein a particular switching device of the plurality of switching devices is directly connected i)

to each neighboring switching 302 in the ordered set of switching devices 302 arranged in the ring topology and ii) to each third switching device 302 in the ordered set of switching devices 302, each third switching device 302 being separated from a previous switching device 302, to which the particular switching device 302 is connected, by a predetermined number of other switching devices in the ordered set. The predetermined number of switching devices 302 that separate each third switching device from the previous switching device 302 to which the particular switching device 302 is directly connected is two switching devices, in the illustrated embodiment. The predetermined number of switching devices 302 that separate each third switching device from the previous switching device 302 to which the particular switching device 302 is directly connected is a suitable number of switching devices other than two switching devices, in the other embodiments.

FIGS. 3B-3E are diagrams illustrating tables 352 that indicate paths via which packets travel from source switching devices 302 to target switching devices 302 in the switching system of FIG. 3A, according to an embodiment. The tables 352 are generally similar to the tables 252 of FIG. 2B. Similar to the embodiments described above with respect to FIG. 2B, configuring the switching devices 302 of FIG. 3A to forward packets from source switching device 302 to target switching devices 302 through the switching system 300 via the links indicated in the corresponding tables 352 of FIGS. 3B-3E ensures that each link 304 in the switching system 300 is either a source link (indicated in FIGS. 3B-3E by non-patterned blocks) configured to only carry packets sourced by a single switching device 302 or a destination link (indicated in FIGS. 3B-3E by patterned blocks) configured to only carry packets that terminate at a next switching device to which the destination link is directly coupled, in an embodiment. A source link coupled to a particular switching device 302 can carry traffic that terminates at a next switching device 302 directly coupled, via the source link, to the particular switching device 302 as long as this traffic is sourced, in the switching system 300, by the particular switching device 302 (i.e., the traffic is not sourced, in the switching system 300, by another one of the switching devices 302), in an embodiment.

FIG. 4 is a flow diagram of an example method 400 for forwarding packets in a switching system that includes a plurality of switching devices arranged in a partial mesh topology, according to an embodiment. In an embodiment, each switching device 102 of FIG. 1A is configured to implement the method 400 to forward packets in the switching system 100. For example, in an embodiment, each packet processor 120 in FIG. 1A is configured to implement at least a portion of the method 400. In another embodiment, each switching device 202 of FIG. 2A is configured to implement the method 400 to forward packets in the switching system 200. In yet another embodiment, each switching device 302 of FIG. 3A is configured to implement the method 400 to forward packets in the switching system 300. In other embodiments, the method 400 is implemented by suitable switching devices different from the switching devices 102, 202, 302 and/or switching devices configured to operate in switching systems different from the switching systems 100, 200, 300.

At block 402, a first switching device receives a packet. For example, in an embodiment, the switching device 102a of FIG. 1A receives a packet. In another embodiment, another suitable switching device receives a packet. The packet is directed to a second switching device in the switching system.

At block 404, the first switching device selects a link for forwarding the packet received at block 402 towards the second switching. In an embodiment, the first switching device accesses a forwarding table to select the link at block 404. For example, the switching device 102a accesses the forwarding table 252a of FIG. 2B, or another suitable forwarding table, to select the link. In an embodiment, the forwarding table is configured to select the link from among i) at least one destination link coupled to the first switching device, the destination link configured to only carry traffic, egressing the first switching device, that terminates at a next switching device directly coupled, via the destination link, to the first switching device and ii) at least one source link coupled to the first switching device, the source link configured to only carry traffic, egressing the first switching device, that is sourced, in the switching system, by the first switching device. A source link coupled to the first switching device can carry traffic that terminates at a next switching device directly coupled, via the source link, to the first switching device as long as this traffic is sourced, in the switching system, by the first switching device (i.e., the traffic is not sourced by another one of the switching devices of the witching system), in an embodiment.

At block 406, the first switching device transmits the packet towards the second switching device via the link selected at block 404. In an embodiment, transmitting the packet at block 406 comprises transmitting the packet either i) via the selected link directly to the second switching device if or ii) via the selected link towards the second switching device via one or more intermediate devices. In an embodiment, the first switching device is configured to, prior to transmitting the packet, store the packet in a VoQ that corresponds to the selected link, or to a port coupled to the selected link, and to transfer the packet from the VoQ to the port only when the port is available for transmitting the packet. Forwarding packets in a switching system via links that are configured to be either source links or destination links, and queuing packets for transmission using VoQs corresponding to ports via which the packets are to be transmitted, generally ensures that the switching system provides non-blocking forwarding of packets, in at least some embodiments.

In an embodiment, a first switching device configured to operate in a switching system that includes a plurality of switching devices arranged in a partial mesh topology. The first switching device comprises an ingress interface device configured to receive a packet directed to a second switching device among the plurality of switching devices. The first switching device also comprises a packet processor configured to access a forwarding table to select a link via which to transmit the packet towards the second switching device, the forwarding table configured to select the link from among i) at least one destination link coupled to the first switching device, the destination link configured to only carry traffic, egressing the first switching device, that terminates at a next switching device directly coupled, via the destination link, to the first switching device and ii) at least one source link coupled to the first switching device, the source link configured to only carry traffic, egressing the first switching device, that is sourced, in the switching system, by the first switching device. The first switching device additionally comprises an egress interface device configured to transmit the packet, via the selected link, towards the second switching device.

In other embodiments, the first switching device also comprises one of, or any suitable combination of two or more of, the following features.

The at least one source link is configured to carry traffic (a) that is sourced, in the switching system, by the first switching device and (b) that either i) terminates at the second switching device if the source link is coupled directly to the second switching device or ii) is forwarded towards the second switching device via a single intermediate switching devices if the source link is not directly coupled to the second switching device.

The egress interface is configured to transmit the packet either i) directly to the second switching device if the selected link is coupled directly to the second switching device or ii) towards the second switching device via only one intermediate switching devices if the selected link is not directly coupled to the second switching device.

The packet processor is configured to store the packet in a virtual output queue (VoQ) that corresponds to the egress interface coupled to the selected link.

The packet processor is configured to, when the egress interface is available to transmit the packet, transfer the packet from the VoQ to the egress interface for transmission of the packet.

The packet is a first packet and the packet processor is further configured to receive a second packet, the second packet directed a third switching device different from the second switching device.

The packet processor is configured to select a second link for transmitting the second packet towards the third switching device.

The second link selected for transmitting the second packet towards the third switching device is the same link as the first link selected for transmitting the first packet towards the second switching device.

The second link selected for transmitting the second packet towards the third switching device is a different link from the first link selected for transmitting the first packet towards the second switching device.

In another embodiment, a method for forwarding packets in a switching system having a plurality of switching devices arranged in a partial mesh topology. The method includes receiving, at a first switching device of the plurality of switching devices, a packet directed to a second switching device of the plurality of switching devices. The method also includes selecting, based on accessing a forwarding table, a link via which to transmit the packet towards the second switching device, the forwarding table configured to select the link from among i) at least one destination link coupled to the first switching device, the destination link configured to only carry traffic, egressing the first switching device, that terminates at a next switching device directly coupled, via the destination link, to the first switching device and ii) at least one source link coupled to the first switching device, the source link configured to only carry traffic, egressing the first switching device, that is sourced, in the switching system, by the first switching device. The method additionally includes transmitting, from the first switching device via the selected link, the packet towards the second switching device.

In other embodiments, the method also includes one of, or any suitable combination of two or more of, the following features.

The at least one source link is configured to carry traffic (a) that is sourced, in the switching system, by the first switching device and (b) that either i) terminates at the second switching device if the source link is coupled directly to the second switching device or ii) is forwarded towards the second switching device via a single intermediate switching devices if the source link is not directly coupled to the second switching device.

Transmitting the packet comprises transmitting the packet via the egress interface either i) directly to the second switching device if the selected link is coupled directly to the second switching device or ii) towards the second switching device via only one intermediate switching devices if the selected link is not directly coupled to the second switching device.

The method further comprises storing the packet in a virtual output queue (VoQ) that corresponds to the egress interface coupled to the selected link.

The method further comprises, when the egress interface is available to transmit the packet, transferring the packet from the VoQ to the egress interface for transmission of the packet.

The packet is a first packet, and the method further comprises receiving a second packet, the second packet directed a third switching device different from the second switching device, selecting a second link for transmitting the second packet towards the third switching device, and transmitting the second packet, via the selected second link, towards the third switching device.

Selecting the second link for transmitting the second packet towards the third switching device comprises selecting the same link as the first link selected for transmitting the first packet towards the second switching device.

Selecting the second link for transmitting the second packet towards the third switching device comprises selecting a different link from the first link selected for transmitting the first packet towards the second switching device.

In still another embodiment, a switching system comprises a plurality of switching devices and an interconnect network configured to interconnect any switching device among the plurality of switching devices to any other switching device among the plurality of switching devices via ones of i) destination links configured to only carry traffic, egressing any particular switching device, that terminates at a next switching device directly coupled to the particular switching device, and ii) source links configured to only carry traffic, egressing any particular switching device, the traffic being sourced, in the switching system, by the particular switching device. A first switching device among the plurality of switching devices includes a forwarding table configured to select a link for transmitting a packet towards a second switching device among the plurality of switching devices, the link selected from among i) at least one source link coupled to the first switching device and ii) at least one destination link coupled to the first switching device.

In other embodiments, the switching system also comprises one of, or any suitable combination of two or more of, the following features.

The plurality of switching devices comprises an ordered set of switching devices arranged in a ring topology, and wherein the interconnect network is configured to connect a particular switching device of the plurality of switching devices only to i) each neighboring switching in the ordered set of switching devices arranged in the ring topology and ii) to each third switching device in the ordered set of switching devices, each third switching device being separated from a previous switching device, to which the particular switching device is directly connected, by a predetermined number of other switching devices in the ordered set.

The interconnect network is configured to connect the particular switching device to each third switching device in the ordered set of switching devices, each third switching device separated from a previous switching device, to which the particular switching device is connected, by two other switching devices in the ordered set.

The at least one source link coupled to the first switching device is configured to carry traffic (a) that is sourced, in the switching system, by the first switching device and (b) that either i) terminates at the second switching device if the source link is coupled directly to the second switching device or ii) is forwarded towards the second switching device via a single intermediate switching devices if the source link is not directly coupled to the second switching device.

The first switching device is configured to transmit the packet either i) via the selected link directly to the second switching device or ii) via the selected link towards the second switching device via only one intermediate switching devices.

The first switching device is configured to store the packet in a virtual output queue (VoQ) that corresponds to the egress interface coupled to the selected link.

The first switching device is configured to, when the egress interface is available to transmit the packet, transfer the packet from the VoQ to the egress interface for transmission of the packet.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While various embodiments have been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A first switching device configured to operate in a switching system that includes a plurality of switching devices, the first switching device comprising:

a plurality of ports configured to couple respectively to a plurality of links, the plurality of links including i) at least one destination link that is directly coupled to a second switching device of a partial mesh topology in the switching system and ii) one or more source links that are coupled to a plurality of other switching devices of the partial mesh topology in the switching system, the plurality of other switching devices including i) a third switching device directly coupled to the first switching device via a first source link among the one or more source links, and ii) a fourth switching device a) directly coupled to the second switching device, b) directly coupled to the third switching device, and c) not directly coupled to the first switching device; and a packet processor configured to access a forwarding table to select links via which packets received by the first switching device are to be transmitted by the first switching device, and to cause packets to be transmitted by the first switching device via the selected links, the forwarding table being configured to i) cause the packet processor to select the at least one destination link only for packets that are to terminate at the second switching device by exiting the switching system at the second switching device, and ii) cause the packet processor to select the one or more source links only for packets that are sourced, in the switching system, by the first switching device and that are not to terminate at the second switching device, including selecting, independent of congestion in the switching system, the one or more source links for i) all packets that are sourced by the first switching device and that are not to terminate at the second switching device, ii) packets that are sourced by the first switching device and are to terminate at the third switching device, and iii) all packets that are sourced by the first switching device and are to terminate at the fourth switching device that is a) directly coupled to the second switching device and b) not directly coupled to the first switching device.

2. The first switching device of claim 1, wherein the forwarding table is configured to cause the packet processor to select the at least one destination link for all packets received by the first switching device and that are to terminate at the second switching device.

3. The first switching device of claim 1, wherein:

the at least one destination link that is directly coupled to the second switching device is an at least one first destination link;

the plurality of links further includes at least one second destination link that is directly coupled to a fifth switching device of the partial mesh topology in the switching system, wherein the fifth switching device is directly coupled to the fourth switching device; and the forwarding table is further configured to i) cause the packet processor to select the at least one second destination link only for packets that are to terminate at the fifth switching device by exiting the switching system at the fifth switching device, and ii) cause the packet processor to select the one or more source links only for packets that a) are sourced, in the switching system, by the first switching device, b) are not to terminate at the second switching device, and c) are not to terminate at the fifth switching device, including selecting, independent of congestion in the switching system, the one or more source links for packets that are to terminate at the fourth switching device that is i) directly coupled to the fifth switching device and ii) not directly coupled to the first switching device.

4. The first switching device of claim 3, wherein the forwarding table is configured to:

cause the packet processor to select the at least one first destination link for all packets received by the first switching device and that are to terminate at the second switching device; and cause the packet processor to select the at least one second destination link for all packets received by the first switching device and that are to terminate at the fifth switching device.

5. The first switching device of claim 4, wherein the forwarding table is configured to cause the packet processor to select, independent of congestion in the switching system, the one or more source links for all packets that a) are sourced, in the switching system, by the first switching device, b) are not to terminate at the second switching device, and c) are not to terminate at the fifth switching device.

6. The first switching device of claim 3, wherein:

the one or more source links are a plurality of source links coupled to a plurality of other switching devices of the partial mesh topology in the switching system different than the second switching device and the fifth switching device; and the forwarding table is configured to cause the packet processor to select, independent of whether congestion in the switching system the plurality of source links only for packets that a) are sourced, in the switching system, by the first switching device, b) are not to terminate at the second switching device, and c) are not to terminate at the fifth switching device.

7. The first switching device of claim 6, wherein:

the forwarding table is configured to cause the packet processor to select, independent of congestion in the switching system, the plurality of source links for all packets that a) are sourced, in the switching system, by the first switching device, b) are not to terminate at the second switching device, and c) are not to terminate at the fifth switching device.

8. A method for forwarding packets in a switching system having a plurality of switching devices, the method comprising:

receiving packets at a first switching device of a partial mesh topology in the switching system, the first switching device including a plurality of ports coupled respectively to a plurality of links, the plurality of links including i) at least one destination link that is directly coupled to a second switching device of the partial mesh topology in the switching system and ii) one or more source links that are coupled to a plurality of other switching devices of the partial mesh topology in the switching system, the plurality of other switching devices including i) a third switching device directly coupled to the first switching device via a first source link among the one or more source links, and ii) a fourth switching device a) directly coupled to the second switching device, b) directly coupled to the third switching device, and c) not directly coupled to the first switching device;

selecting, based on accessing a forwarding table of the first switching device, links from among the plurality of links for transmitting packets received by the first switching device, wherein selecting the links comprises:

selecting the at least one destination link only for packets that are to terminate at the second switching device by exiting the switching system at the second switching device, and selecting the one or more source links only for packets that are sourced, in the switching system, by the first switching device and that are not to terminate at the second switching device, including selecting, independent of congestion in the switching system, the one or more source links i) all packets that are sourced by the first switching device and that are not to terminate at the second switching device, ii) packets that are sourced by the first switching device and are to terminate at the third switching device, and iii) all packets that are sourced by the first switching device and are to terminate at the fourth switching device that is a) directly coupled to the second switching device and b) not directly coupled to the first switching device; and transmitting, by the first switching device, packets via ports corresponding to links selected based on accessing the forwarding table.

9. The method of claim 8, wherein selecting links based on accessing the forwarding table comprises selecting the at least one destination link for all packets received by the first switching device and that are to terminate at the second switching device.

10. The method of claim 8, wherein:

the at least one destination link that is directly coupled to the second switching device is a at least one first destination link;

the plurality of links further includes at least one second destination link that is directly coupled to a fifth switching device of the partial mesh topology in the switching system, wherein the fifth switching device is directly coupled to the fourth switching device; and selecting links based on accessing the forwarding table further comprises:

selecting the at least one second destination link only for packets that are to terminate at the fifth switching device by exiting the switching system at the fifth switching device, and selecting the one or more source links only for packets that a) are sourced, in the switching system, by the first switching device, b) are not to terminate at the second switching device, and c) are not to terminate at the fifth switching device, including selecting, independent of congestion in the switching system, the one or more source links for packets that are to terminate at the fourth switching device that is i) directly coupled to the fifth switching device and ii) not directly coupled to the first switching device.

11. The method of claim 10, wherein selecting links based on accessing the forwarding table comprises:

selecting the at least one first destination link for all packets received by the first switching device and that are to terminate at the second switching device; and selecting the at least one second destination link for all packets received by the first switching device and that are to terminate at the fifth switching device.

12. The method of claim 11, wherein selecting links based on accessing the forwarding table comprises selecting, independent of congestion in the switching system, the one or more source links for all packets that a) are sourced, in the switching system, by the first switching device, b) are not to terminate at the second switching device, and c) are not to terminate at the fifth switching device.

13. The method of claim 10, wherein:

the one or more source links are a plurality of source links coupled to a plurality of other switching devices of the partial mesh topology in the switching system different than the second switching device and the fifth switching device; and selecting links based on accessing the forwarding table comprises selecting, independent of congestion in the switching system, the plurality of source links only for packets that a) are sourced, in the switching system, by the first switching device, b) are not to terminate at the second switching device, and c) are not to terminate at the fifth switching device.

14. The method of claim 13, wherein selecting links based on accessing the forwarding table comprises:

selecting, independent of congestion in the switching system, the plurality of source links for all packets that a) are sourced, in the switching system, by the first switching device, b) are not to terminate at the second switching device, and c) are not to terminate at the fifth switching device.

15. A switching system, comprising:

a plurality of switching devices including a first switching device, a second switching device, a third switching device, and a fourth switching device; and an interconnect network configured to interconnect any switching device among the plurality of switching devices to any other switching device among the plurality of switching devices via ones of i) destination links, and ii) source links, each destination link directly coupling a respective first pair of switching devices and being for carrying packets that are to terminate at the respective first pair of switching devices by exiting the switching system at the respective first pair of switching devices, and each source link directly coupling a respective second pair of switching devices and being for carrying i) packets that are to terminate at the respective second pair of switching devices by exiting the switching system at the respective second pair of switching devices and ii) packets that are to terminate at one or more other switching devices different from the respective second pair of switching devices;

wherein the destination links include at least one first destination link that directly couples the first switching device and the second switching device, and wherein the source links include one or more first source links that directly couple the first switching device with the third switching device;

wherein the fourth switching device is i) directly coupled to the second switching device, ii) directly coupled to the third switching device, and iii) not directly coupled to the first switching device;

the first switching device comprising a packet processor configured to access a forwarding table to select links via which packets received by the first switching device are to be transmitted by the first switching device, and to cause packets to be transmitted by the first switching device via the selected links, the forwarding table being configured to i) cause the packet processor to select the at least one first destination link only for packets that are to terminate at the second switching device by exiting the switching system at the second switching device, and ii) cause the packet processor to select the one or more first source links only for packets that are sourced, in the switching system, by the first switching device and that are not to terminate at the second switching device, including selecting, independent of congestion in the switching system, the one or more first source links for i) all packets that are sourced by the first switching device and that are not to terminate at the second switching device, ii) packets that are sourced by the first switching device and are to terminate at the third switching device, and iii) all packets that are sourced by the first switching device and are to terminate at the fourth switching device that is a) directly coupled to the second switching device and b) not directly coupled to the first switching device.

16. The switching system of claim 15, wherein the interconnect network is configured to:

directly communicatively couple each switching device of the plurality of switching devices only to i) each respective neighboring switching device in an ordered set of switching devices arranged in a ring topology and ii) to a respective further switching device in the ordered set of switching devices that is separated from the each switching device by a predetermined number of other switching devices in the ordered set, so that each switching device is directly communicatively coupled to at least three more switching devices among the plurality of switching devices and less than all switching devices in the plurality of switching devices.

17. The switching system of claim 16, wherein the respective further switching device in the ordered set of switching devices is separated from the each switching device by two other respective switching devices in the ordered set.

18. The switching system of claim 15, wherein the forwarding table is configured to cause the packet processor to select the at least one first destination link for all packets received by the first switching device and that are to terminate at the second switching device.

19. The switching system of claim 15, wherein the interconnect network is configured to communicatively couple the plurality of switching devices according to a partial mesh topology in which each switching device is directly communicatively coupled to at least two more switching devices among the plurality of switching devices and less than all switching devices in the plurality of switching devices.

* * * * *